May 7, 1963 D. T. WEBB 3,089,095

SQUELCH CIRCUITS FOR STEREOPHONIC RECEIVERS

Filed April 8, 1959 5 Sheets-Sheet 1

INVENTOR.
DERIL T. WEBB
BY
Robert D. Sanborn
ATTORNEY

May 7, 1963 D. T. WEBB 3,089,095

SQUELCH CIRCUITS FOR STEREOPHONIC RECEIVERS

Filed April 8, 1959 5 Sheets-Sheet 2

INVENTOR.
DERIL T. WEBB

BY
Robert D. Sanborn
ATTORNEY

May 7, 1963 D. T. WEBB 3,089,095

SQUELCH CIRCUITS FOR STEREOPHONIC RECEIVERS

Filed April 8, 1959 5 Sheets-Sheet 3

INVENTOR.
DERIL T. WEBB
BY Robert D. Sanborn
ATTORNEY

May 7, 1963 D. T. WEBB 3,089,095

SQUELCH CIRCUITS FOR STEREOPHONIC RECEIVERS

Filed April 8, 1959 5 Sheets-Sheet 4

INVENTOR.
DERIL T. WEBB
BY
Robert D. Sanborn
ATTORNEY

May 7, 1963 D. T. WEBB 3,089,095

SQUELCH CIRCUITS FOR STEREOPHONIC RECEIVERS

Filed April 8, 1959 5 Sheets-Sheet 5

INVENTOR.
DERIL T. WEBB.
BY Robert D. Sanborn
ATTORNEY

United States Patent Office 3,089,095

Patented May 7, 1963

3,089,095
SQUELCH CIRCUITS FOR STEREOPHONIC RECEIVERS

Deril T. Webb, Norristown, Pa., assignor, by mesne assignments, to Philco Corporation, Philadelphia, Pa., a corporation of Delaware Filed Apr. 8, 1959, Ser. No. 805,018
14 Claims. (Cl. 329—135)

The present invention relates to receiver squelch circuits and more particularly to improvements in squelch circuits for use in signal receivers for compatible single channel amplitude modulated stereophonic transmissions.

It is known that two stereophonic program signals may be transmitted over a single amplitude modulation radio channel. One known method for accomplishing this comprises first separately modulating the two program signals on differently phased carrier waves and then linearly combining the two modulated carrier waves to produce a single resultant carrier wave and four sidebands, two for each of the two stereophonic program signals. The same resultant signal may also be formed by other modulation techniques such as modulating the carrier in amplitude by a signal representing approximately the sum of the two program signals and in phase by a signal representing approximately the difference between the two program signals. At the receiver the two stereophonic program signals may be separated and directed to separate, spaced speakers by supplying the composite signal to two or more detector circuits, at least one of which is a synchronous detector circuit. A reference signal at the average carrier frequency of the composite signal is supplied to the synchronous detector or detectors to effect the desired signal separation. The phase of the reference signal determines the component of the stereophonic modulation signals which will be extracted from the composite wave. By adjusting the phase of the reference signal with respect to the composite carrier component either one of the two program signals, the sum of the two program signals or the difference between the two program signals may be selected. The reference signal is usually maintained at the proper frequency by an automatic phase control circuit which compares the phase and/or frequency of the reference signal with the phase and/or frequency of the incoming carrier wave. The phase control circuit supplies a signal indicative of the difference, if any, between the phases of the two signals to a frequency control means such as a reactance tube associated with the reference oscillator.

In a receiver of the type described a beat note is generated at the output of the synchronous detector and at the output of the phase control circuit if the frequency of the reference signal is different from the frequency of incoming carrier wave component at the input to the detector. The phase control circuit cannot act instantaneously to correct the frequency of the reference signal. Therefore, if the tuning of the receiver is changed to select a given station or channel for reception, there may be a short interval during which the reference frequency generated at the receiver is not exactly equal to the incoming carrier wave. The duration of this interval will depend upon the rate of response and the pull-in range of the circuits which control the phase and frequency of the reference signal. If not suppressed, the beat signal at the output of the synchronous detector will produce an undesirable audio note or howl in the output of the receiver. This beat signal will change in frequency as the reference signal is automatically corrected to the proper frequency and phase and will disappear entirely once the reference signal reaches the proper operating frequency. Since the beat signal changes in frequency over a range which includes the frequency range of the desired stereophonic information signals, it is not possible to separate the undesired beat signals from the desired stereophonic signals by filters placed between the synchronous detectors and the loud-speakers.

Prior art circuits have suppressed or squelched the beat note at the output of the receiver by detecting the beat note which occurs also in the phase control circuit and supplying the detected signal to the audio amplifiers as a squelch signal. The squelch circuit just described is subject to two major disadvantages. First, the entire audio output of the receiver is either greatly reduced in volume or is eliminated completely by the squelch. The temporary absence of an audio output signal may prove disconcerting to the listener attempting to tune the receiver. A second and more serious disadvantage is that certain types of program material may cause a signal resembling an interference beat signal between the carrier wave and the reference signal to appear at the output of the phase control means. This signal will be detected and will squelch the receiver even though the reference signal is at the proper phase and frequency. This produces intolerable interruptions in the received program even in properly tuned receivers.

It is an object of the present invention to provide an improved squelch circuit for stereophonic receivers which eliminates undesirable beat notes from the output of the receiver without materially affecting the program signal level.

Still another object of the present invention is to provide a novel squelch circuit which is substantially unaffected by changes in program material.

Still another object of the present invention is to provide a novel stereo receiver in which a program signal is present even though the reference signal is not at the proper phase and/or frequency.

In general these and other objects of the present invention are achieved by demodulating the composite received signal to provide two or more signals each made up of different combinations of the two stereophonic program signals and the beat signal, if present. These signals are combined to produce mutual cancellation of the program signals. The residual beat signal is detected to provide a squelch signal. The two stereophonic output signals of said receiver are each formed by differently combining a beat-free sum signal with a difference signal which may include a beat signal. The squelch signal is employed to suppress only the difference signal.

For a better understanding of the present invention together with other and further objects thereof reference should be had to the following detailed description which is to be read in conjunction with the accompanying drawings in which.

Figure 1:
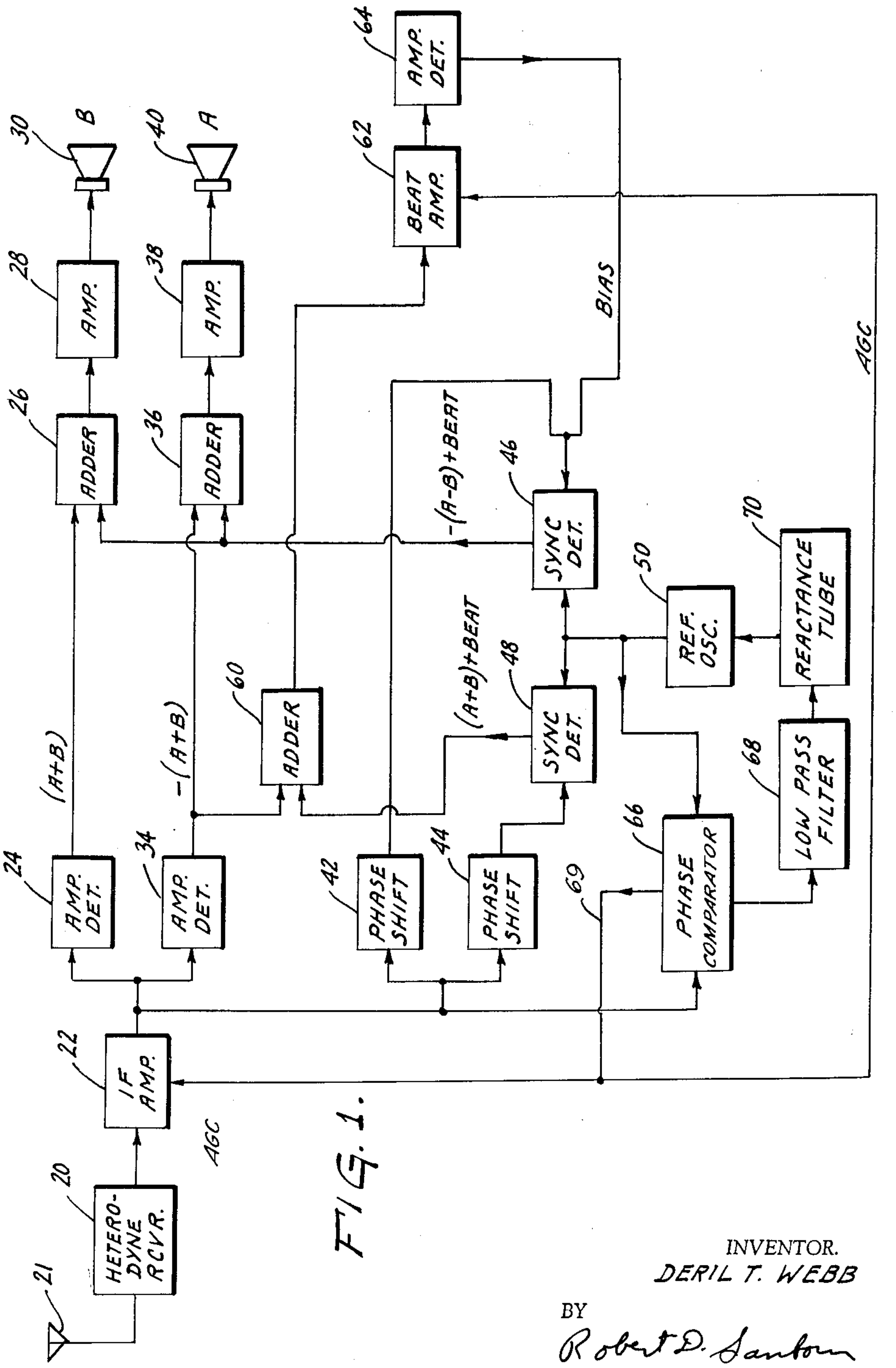
FIG. 1 is a block diagram of a stereophonic receiver embodying the present invention.

In FIG. 1 the block 20 represents the portion of a heterodyne receiver circuit which normally precedes the intermediate frequency amplifier. Block 20 may represent radio frequency amplifier stages and/or a heterodyne converter circuit coupled to antenna 21. It also includes a suitable local oscillator for beating the received signal to the desired intermediate frequency. Since heterodyne converter circuits of the type normally employed in monaural receivers may be employed also in stereophonic receivers, the circuits represented by block 20 will not be described in detail. The output of circuits 20 is connected to the input of an intermediate frequency amplifier 22.

One stereophonic channel in the receiver shown in FIG. 1 comprises an envelope or amplitude detector 24, an adder circuit 26, an audio frequency amplifier 28 and a speaker 30 connected in cascade from the output of intermediate frequency amplifier 22. This channel is designated in FIG. 1 as the "B" channel. The second or "A" channel shown in FIG. 1 comprises an envelope or amplitude detector 34, an adder circuit 36, an audio amplifier 38 and a speaker 40. Corresponding units in the two channels may be identical with the exception of amplitude detector 34 which preferably provides a detected output signal component which is of opposite polarity from the signal provided by amplitude detector 24. If diode detectors are employed in circuits 24 and 34 the desired phase difference may be achieved by simply reversing the connection of the diode in one of the detectors.

The output of IF amplifier 22 is also supplied through phase shifters 42 and 44, respectively, to a program signal input of synchronous detectors 46 and 48. Synchronous detectors 46 and 48 are supplied with a reference signal from oscillator 50. As will be explained in more detail presently the phase shifters 42 and 44 are selected so that the output signal of synchronous detector 46 is a detected signal which is representative of the difference of the two stereophonic program signals and the output signal of synchronous detector 48 is a detected signal which is representative of the sum of the two stereophonic program signals. Since the two stereophonic program signals are commonly referred to as the "A" and "B" signals, respectively, the sum of the two program signals will be referred to hereinafter as the $(A+B)$ signal and the difference between the two program signals will be referred to as the $(A-B)$ signals. The reversed polarity versions of these two signals will be referred to as the $-(A+B)$ and the $-(A-B)$ signals, respectively.

The output of synchronous detector 46 is supplied to a second input of each of the adders 26 and 36. The output of synchronous detector 48 is supplied to an adder circuit 60 which receives a second input from amplitude detector 34. The output of adder circuit 60 is connected through an audio frequency beat amplifier 62 to an amplitude detector 64. The detected output signal of detector 64 is supplied as a bias or squelch signal to synchronous detector 46.

Reference oscillator 50 is maintained at the proper phase and frequency by a phase comparator circuit 66 which receives one input from intermediate frequency amplifier 22 and a second input from reference oscillator 50. The phase comparator circuit 66 is illustrated in more detail in the schematic diagram of FIG. 7. The phase control output of comparator circuit 66 is connected through a low pass filter 68 to a reactance tube 70. Reactance tube 70 is coupled to the reference oscillator 50 in a manner to control the frequency of the signal provided by oscillator 50. While a reactance tube has been shown in the block diagram in FIG. 1 it should be obvious to anyone skilled in the art that other signal responsive frequency control means such as capacitors having a capacitance which is a function of signal amplitude may be employed instead. Comparator 66 may also supply an automatic gain control signal to amplifiers 22 and 62 by way of connection 69. This feature is described in more detail in FIG. 5.

Figure 2:
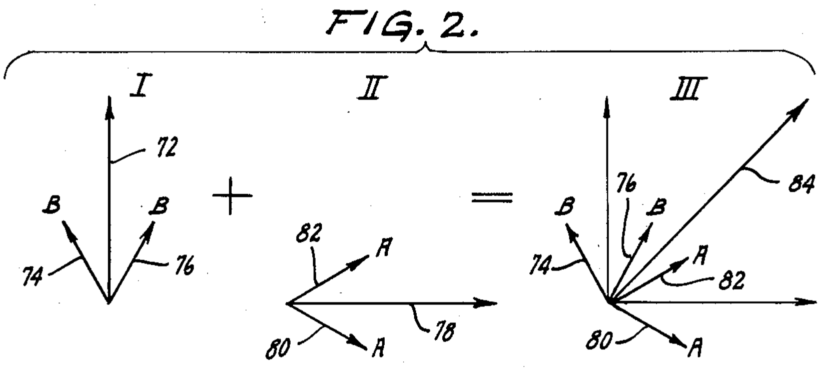
FIGS. 2 and 3 are vector diagrams which represent the possible phase relationships of signals present in the receiving system of FIG. 1.

The phase relationships between the various components of a single channel multiplex stereophonic signal of the type which will actuate the receiver of FIG. 1 are illustrated in the series of vector diagrams of FIG. 2. Vector 72 of FIG. 2–I represents a carrier wave which is modulated by the B program signal. The modulation components are represented in the conventional fashion by counter-rotating vectors 74 and 76. Vector 78 in FIG. 2–II represents a carrier wave which is in phase quadrature with the carrier wave 72. Carrier wave 78 is amplitude modulated with the program signal from channel A. The modulation components are again represented in conventional fashion by the counter-rotating vectors 80 and 82. If the signals represented by the vector system of FIG. 2–I are linearly added to the signals represented by the vector system of FIG. 2–II, the resultant signal may be represented by the single resultant carrier wave vector 84 and the four modulation components 80, 82, 74 and 76 shown in FIG. 2–III. As is well known, the signals represented by the vector system shown in FIG. 2–III may be heterodyned up or down in frequency without changing the relative phase relationships between the carrier wave and the modulation or program components.

Figure 3:
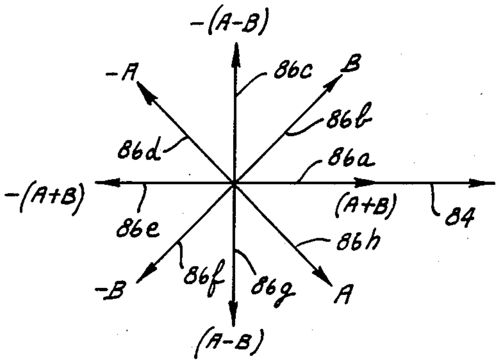

If the composite signal represented by the carrier wave 84 and its associated modulation components is supplied to an amplitude detector the output signal from this detector will represent approximately the sum of the A and B modulation signals. If the composite signal represented by result of vector 84 and its associated modulation components are supplied to a synchronous detector which is also energized by a reference signal of the same frequency as the carrier wave represented by vector 84, the output signal of the synchronous detector will be a signal representative of one or the other of the two stereophonic program signals, the sum of the two stereophonic program signals or the difference of the two stereophonic program signals depending upon the phase of the reference signal with respect to the phase of the carrier wave. FIG. 3 is a vector diagram illustrating the phase of the reference signal necessary to produce each of the above-mentioned output signals. In FIG. 3 vector 84 corresponds to the similarly numbered vector in FIG. 2–III. Vectors $86_a$ to $86_h$ represent different possible phases of the reference signal with respect to the carrier wave represented by vector 84. It will be noted from FIG. 3 that if the reference signal has a phase as represented by vector $86_a$, that is, if it is in phase with the carrier wave represented by vector 84, the signal from the synchronous detector will be the sum of the two stereophonic program signals. This is represented by the legend $(A+B)$ at the head of vector $86_a$. If the reference signal is 180° out of phase with the carrier wave as represented by vectors 84 and $86_e$ in FIG. 3, the output of the synchronous detector will again be the sum of the two program signals but it will be inverted with respect to the first mentioned sum signal. This is represented in FIG. 3 by the legend $-(A+B)$ at the head of vector $86_e$. As will be seen from FIG. 3, if the reference signal is in quadrature with the carrier wave 84, the demodulated signal at the output of the synchronous detector will be representative of the difference of the two stereophonic program signals. This condition is represented by the legends $-(A-B)$ and $(A-B)$ at the heads of vectors $86_c$ and $86_g$, respectively. If the reference voltage is displaced from the carrier wave 84 by odd multiples of 45° as shown by vectors $86_b$, $86_d$, $86_f$ and $86_h$, only a single program signal will appear at the output of the synchronous detector.

It will be assumed that the signal at the output of intermediate frequency amplifier 22 may be represented by the vector system shown in FIG. 2–III. As mentioned above, amplitude detectors 24 and 34 will demodulate this signal and supply a sum signal or $(A+B)$ signal to one input of adders 26 and 36, respectively. A signal supplied by amplitude detector 34 is inverted with respect to the signal supplied by detector 24. This may be accomplished by employing identical detector elements in blocks 24 and 34 with an inverting amplifier stage in one of the detectors 34 or it may be accomplished by reversing the connection of the diode or other detecting element in one of the two envelope detectors. Phase comparator 66 of FIG. 1 compares the phase of the carrier wave from amplifier 22 with the phase of the signal from reference oscillator 50. If the carrier wave from amplifier 22 differs in phase from the signal of reference oscillator 50, phase comparator 66 will supply a direct voltage signal to low pass filter 68. Reactance tube 70 will bring about a phase correction by momentarily changing the frequency of oscillator 50. If the frequency of oscillator 50 differs slightly from the frequency of the carrier wave from amplifier 22, there will be a cyclic change in phase between the two signals and a corresponding cyclic signal will be supplied to low pass filter 68. If the signal is of sufficiently low frequency to be passed by filter 68 the effect of reactance tube 70 on reference oscillator 50 is to cause the oscillator 50 to assume the same frequency and phase as the carrier wave from amplifier 22. The operation of an automatic phase control loop of the type described is well known in the art and particularly in the color television art. Phase shifter 44 controls the phase of the composite signal from the output of amplifier 22 so that synchronous detector 48 provides an $(A+B)$ signal, that is, a signal representative of the sum of the two stereophonic program signals. Similarly phase shifter 42 causes synchronous detector 46 to provide a $-(A-B)$ signal, that is, a signal representative of the difference of the two program signals. The signal from synchronous detector 46 is supplied to a second input of each of adder circuits 26 and 36. Since the phase of the signals to synchronous detector 46 is such that the output signals is represented by $-(A-B)$ the addition of this signal to the $(A+B)$ signal from amplitude detector 24 will provide an output signal from adder 26 which is equal to 2B. The factor 2 merely represents an amplitude multiplying factor and not a frequency multiplying factor. The addition of the $-(A-B)$ signal from synchronous detector 46 to the $-(A+B)$ signal from envelope detector 34 provides an output signal from adder 36 of —2A. The minus sign in this expression represents an inversion in phase. A reversal in phase in the B channel would cause identical components in the A and B program signals to drive the A and B speakers out of phase. This would result in the acoustical signal from one speaker at least partially cancelling the acoustical signal from the other speaker owing to the acoustic coupling between the two speakers. Since the acoustic coupling increases as the frequency decreases the effect would be more noticeable at low frequencies. The effect of the phase inversion in the B channel may be eliminated by employing a single stage inverting amplifier in amplifier 38 or, more economically, by reversing the connections to the voice coil of speaker 40.

During the lock-in period which occurs each time the receiver is tuned to a new station the signal from each of synchronous detectors 46 and 48 will include a beat signal equal in frequency to the difference in frequency between reference oscillator 50 and the carrier wave supplied by intermediate frequency amplifier 22. This beat signal is inherent in the synchronous detection process. It will be seen from FIG. 1 that if the signal from detector 46 is supplied to adders 26 and 36 during the lock-in interval, the beat signal present on the output of detector 46 will appear in both speakers 30 and 40. It will be seen also that if the signal from synchronous detector 46 is eliminated during the tuning interval the beat signal is entirely eliminated from speakers 30 and 40 since no beat signal is developed by envelope detectors 24 and 34. Further, the elimination of the signal from synchronous detector 46 results in the same monaural signal, i.e. the $(A+B)$ signal, being supplied by speakers 30 and 40. The additional inverting amplifier stage in amplifier 38 or the reversal of the connection to speaker 40 will compensate for the difference in polarity between the signals provided by envelope detector 34 and envelope detector 24. Therefore the sound waves emanating from the two speakers again will be in phase. The $(A+B)$ signal is similar to the conventional monophonic program signal which is formed by mixing the signals from two or more spaced microphones. Therefore, elimination of the signal from synchronous detector 46 merely causes the signals supplied from speakers 30 and 40 to change from a stereophonic presentation to a monophonic presentation. There will not be any appreciable change in volume since the $(A+B)$ signal represents approximately the same audio power as the 2A or 2B signals normally provided by speakers 30 and 40.

The means by which the signal from synchronous detector 46 is suppressed during the tuning interval will now be described. The $-(A+B)$ signal from envelope detector 34 is supplied to one input of adder circuit 60. The $(A+B)$ signal plus beat, if any, supplied by synchronous detector 48 is supplied to adder circuit 60. Since the program signal component supplied to the two inputs of adder 60 are substantially equal and opposite in phase they will cancel in adder 60 leaving the beat signal, if any, from the signal supplied by synchronous detector 48. The signal from envelope detector 34 may include a distortion component due to the fact that the amplitude of the envelope of the signal from intermediate frequency amplifier 22 is only approximately proportional to $(A+B)$. This distortion component has zero amplitude if the A and B signals are identical in phase and frequency and increases from this zero value as the difference between the two program signals increases. This distortion component appears as a false beat note in the output of adder 60. However it has been found in practice that the amplitude of this distortion component is always much less than the amplitude of the beat component. Therefore by properly controlling the amplitude of the signal supplied to synchronous detector 48 and the gain of amplifier 62 the squelch circuit can be made to respond to the beat signal only. As explained above, this beat signal occurs only when the signal from oscillator 50 differs in frequency from the carrier wave supplied by amplifier 22 and will disappear once the phase control loop including comparator 66, low pass filter 68 and reactance tube 70 have established the desired locked frequency relationship between reference oscillator 50 and the carrier wave from amplifier 22. The beat signal at the output of adder 60 is supplied through an amplifier 62 to a detector circuit 64. Detector 64 provides a signal which is proportional in amplitude to the beat signal supplied by amplifier 62. This detected beat signal has a polarity such that it reduces the amplitude of the signal supplied by detector 46 to adder circuits 26 and 36. In the preferred embodiment of the invention the bias signal from detector 64 is a negative bias signal which completely cuts off synchronous detector 46 so that no beat signal appears at speakers 30 and 40. Once the automatic phase control loop has established the desired frequency relationship between the signal from oscillator 50 and the carrier wave from amplifier 22 the beat signal disappears from the output of synchronous detector 48 and therefore from the output of adder 60 and amplifier 62. Since no beat signal is supplied from amplifier 62 to detector 64 no negative bias signal is developed by detector 64 and synchronous detector 46 is restored to normal operation. Therefore a complete program signal in monaural form is provided once the station is tuned in and before the reference oscillator is servoed to the proper frequency. This program signal changes to a stereophonic signal once the reference oscillator has assumed the proper phase and frequency.

Figure 4:
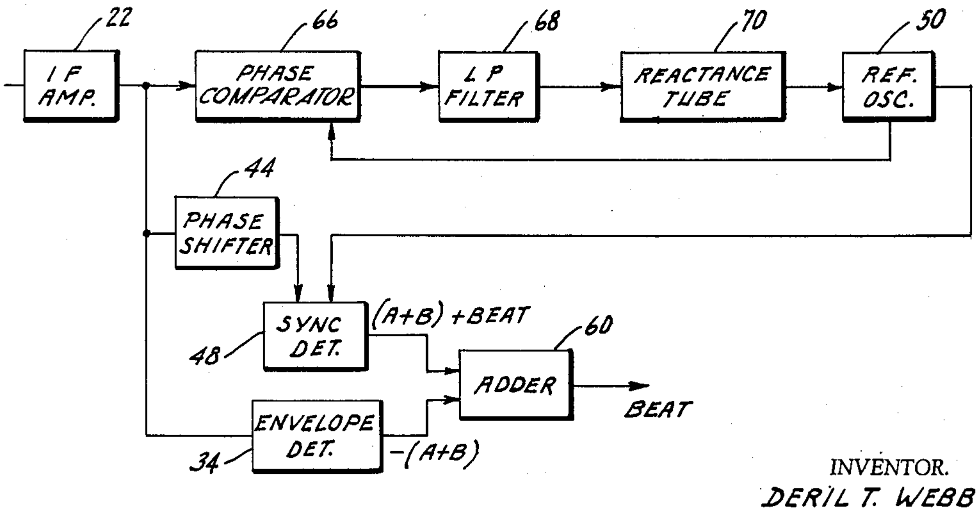
FIG. 4 is a block diagram of the beat detector portion of the system of FIG. 1.

FIG. 4 is a block diagram which shows only those components of FIG. 1 which are employed in developing the beat signal. Since the circuit of FIG. 4 is extracted directly from the circuit of FIG. 1 it requires no separate description.

Figure 5:
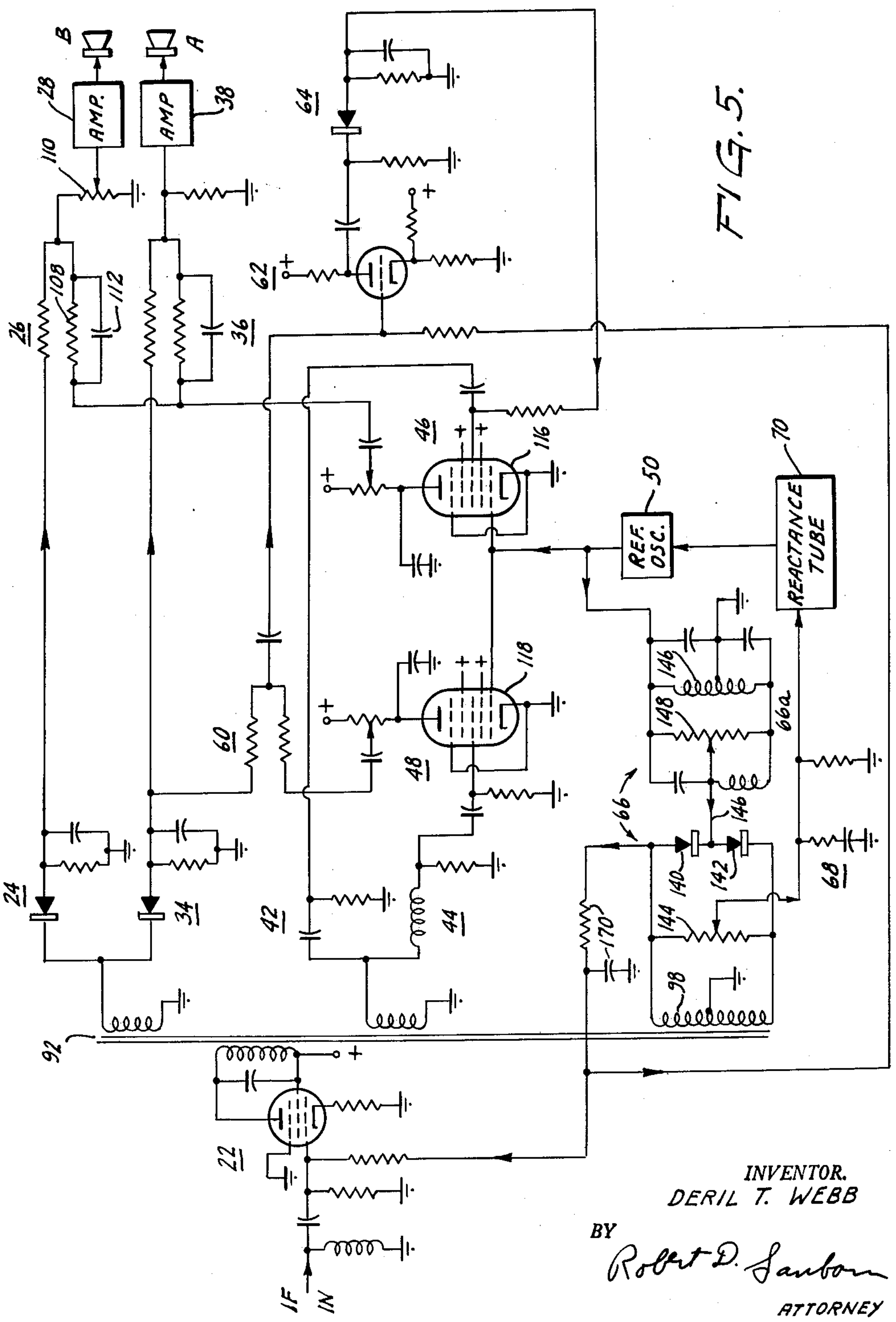
FIG. 5 is a detailed schematic diagram of the intermediate frequency and audio frequency sections of a receiver arranged in accordance with the block diagram of FIG. 1.

FIG. 5 shows by way of illustration a schematic diagram of one preferred stereophonic receiver circuit arranged in accordance with the block diagram of FIG. 1. The circuits represented by a block 20 in FIG. 1 are not shown in FIG. 5 since they may be conventional heterodyne receiver circuits. Circuits in FIG. 5 corresponding to blocks in FIG. 1 have been identified by the same reference numerals. In adder circuit 26 resistor 110 is provided with a movable tap which serves as an amplitude balance control for the A and B channels. By adjusting the tap on resistor 110 the gain of the A and B channels can be equalized. Resistor 108 in adder circuit 26 is bypassed by a capacitor 112 which provides high frequency compensation for the capacitance component of the output impedance of synchronous detector 46.

Phase shifters 42 and 44 each provide a phase shift of approximately 45 degrees. Therefore the intermediate frequency signals from amplifier 22 are supplied to synchronous detectors 46 and 48 in phase quadrature.

The two synchronous detectors 46 and 48 comprise pentagrid tubes 116 and 118. The signal from reference oscillator 50 is supplied to the first grid of each tube. The signal from phase shifter 44 is supplied to the third grid of electron tube 118 and the signal from phase shifter 42 is supplied to the third grid of electron tube 116.

The phase comparator circuit 66 of FIG. 5 is energized from the center tapped winding 98 of transformer 92. The network *66a* shown in FIG. 5 is a variable phase shift circuit. The phase of the signal at output connection 146 is controlled by controlling the position of tap on potentiometer 148. The type of phase shifter shown has the advantage that the amplitude of the signal at output connection 146 remains substantially constant as the position of tap 148 is changed. The phase adjustment provided by the phase shifter *66a* is a preliminary alignment adjustment which is not changed during normal operation of the system. Therefore in the interest of economy of manufacture phase shifter *66a* may be replaced by a simple resistor capacitor phase shift circuit similar to phase shift circuit 42.

The total signal impressed across diode detector 140 is the vector sum of the intermediate frequency signal supplied by winding 98 and the reference signal supplied by the phase shifter *66a* just described. Similarly the signal impressed across diode 142 is the vector sum of the intermediate frequency signal and the phase shifted reference signal. Therefore, if the frequency of the carrier wave supplied by winding 98 is the same as the frequency of oscillator 50 and the carrier wave supplied by winding 98 is in phase quadrature with the reference signal at the common terminals of diodes 140 and 142, the average signal developed across diodes 140 and 142 will be equal. Since the two ends of potentiometer 144 will be at equal but opposite potentials with respect to ground, the center point will be at ground potential. If the phase of the carrier wave changes from its quadrature relationship with respect to the reference signal supplied by phase shifter *66a*, the average value of signal across one of the diodes 140 and 142 will increase while the average value of the signal across the other diode will decrease. The two ends of the potentiometer 144 will then be at opposite but unequal potentials with respect to ground and the center point will be at some potential removed from ground.

Reactance tube 70 which receives its control signal from the tap on potentiometer 144 controls the phase of the reference signal by momentarily increasing or decreasing the frequency of oscillator 50 until the phase control servo loop just described reaches its null condition.

The phase shift introduced by phase shifter *66a* is such that the output signal of this phase shifter is in phase quadrature with the carrier wave signal supplied by winding 98 when the reference signal supplied to synchronous detector 48 by oscillator 50 is in phase with the carrier wave component received from phase shifter 44. In determining the proper phase shift for circuit *66a* it is necessary to take into account phase shifts in the transformer 92 as well as the phase shift introduced by phase shifter 44. Tap 144 provides means for adjusting the circuit to provide equal pull-in range on either side of the final operating point of the circuit.

As mentioned above the amplitude of the signal at the output of amplifier 62 must be controlled so that the distortion components contributed by envelope detector 34 do not result in the squelching of synchronous detector 46. The amplitude of the signal supplied to detector 64 is held at the proper value by automatic gain control signals supplied by phase comparator circuit 66 to intermediate frequency amplifier 22 and beat amplifier stage 62. As is well known, the signal at the anode of diode 140 has an average value which is negative with respect to ground and which increases as the amplitude of the carrier wave supplied by winding 98 increases. Therefore the anode of diode 140 is connected through a low pass filter 170 to the control grids of amplifier stages 22 and 62 to provide an automatic gain control bias for these tubes. The remainder of FIG. 5 is believed to be self-explanatory.

Figure 6:
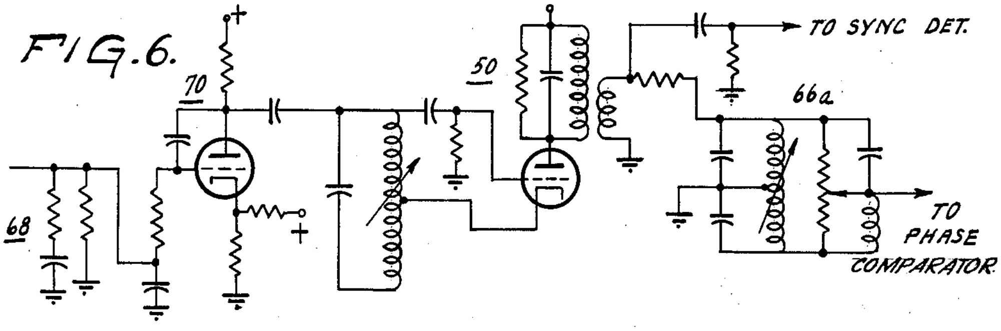
FIG. 6 is a schematic diagram of the reactance tube and reference oscillator circuits which may be employed in the circuit of FIG. 5.

Reactance tube 70 and oscillator 50 may be conventional in form and for this reason have been shown in block form in FIG. 5. However in the interest of particularly pointing out one preferred embodiment of the invention one form of reactance tube-oscillator circuit which has operated satisfactorily in practice is shown in FIG. 6. Circuits in FIG. 6 are numbered to correspond to the lock diagram of FIG. 1.

Figure 7:
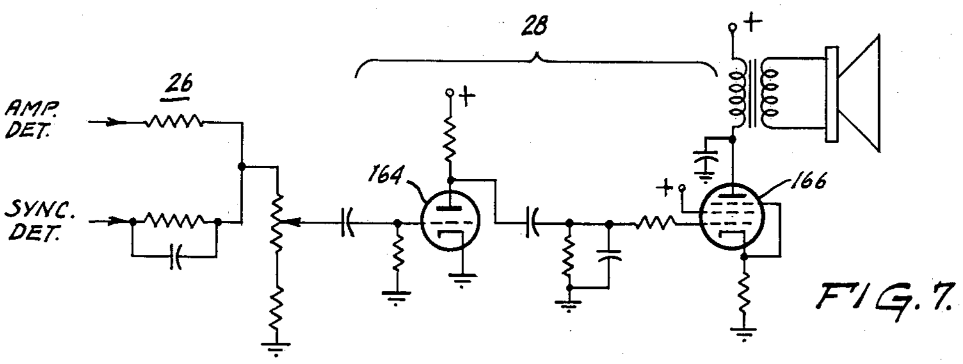
FIG. 7 is a schematic diagram of an audio amplifier circuit which may be employed in the circuit of FIG. 5.

As indicated previously, amplifiers 28 and 38 of FIGS. 1 and 5 may be conventional audio amplifiers. FIG. 7 illustrates one circuit which has been found to operate well in practice. This circuit comprises two audio amplifier stages 164 and 166. Amplifiers 28 and 38 should have similar response characteristics so that the signals from the two channels may be properly balanced.

Figure 8:
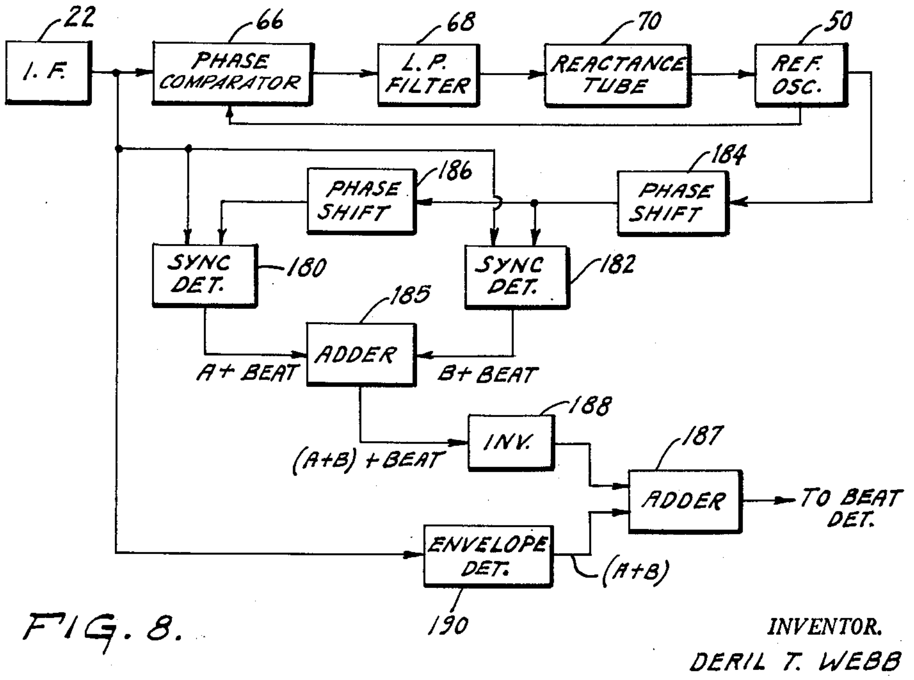
FIG. 8 is a block diagram similar to FIG. 4 showing alternative systems for developing a pure beat signal.

FIG. 8 illustrates an alternative arrangement for developing a beat signal without program signal components. Intermediate frequency amplifier 22, phase comparator 66, low pass filter 68, reactance tube 70 and reference oscillator 50 correspond to similarly numbered elements in FIG. 1. The modulated carrier wave from intermediate frequency amplifier 22 is supplied to the program signal inputs of two synchronous detectors 180 and 182. The reference signal from oscillator 50 is supplied to synchronous detectors 180 and 182 through phase shifters 184 and 186. The constants of these phase shifters are so chosen that the output signal of detector 180 is the "A" program signal and the output of synchronous detector 182 is the "B" program signal. The outout signals of detectors 180 and 182 are combined in adder circuit 185. The output of adder circuit 185 is supplied to one input of an adder circuit 187 through an inverter circuit 188. An envelope detector 190 is coupled to the output of intermediate frequency amplifier 22. The output of envelope detector 190 is supplied to a second input of adder circuit 187. It will be seen that the output of adder 185 in FIG. 8 will represent the sum of the two program signals, that is a signal represented by $(A+B)$. This signal will also include any beat signal which may be developed in synchronous detectors 180 and 182 owing to a frequency difference between the carrier wave supplied by amplifier 22 and the reference signal supplied by oscillator 50. The output of inverter 188 is a signal which may be represented as $-(A+B)$. This signal will also include the beat signal mentioned above. The output of envelope detector 190 will be a sum signal which may be represented as $(A+B)$. There will be no beat signal present in the signal from detector 190 but the distortion components mentioned above will be present for large differences between the A and B signals. The addition of the signal from envelope detector 190 to the signal provided by inverter 188 will result in the cancellation of the program signals leaving only the beat signal and the distortion components, if present, in the output of adder circuit 187. The effect of the distortion components may be minimized by controlling the amplitude of the intermediate frequency signal supplied to detectors 180 and 182 and further controlling the amplitude of the signal supplied by adder circuit 187.

The circuit shown in FIG. 8 may be modified by placing phase shifters 184 and 186 in the connection from intermediate frequency amplifier 22 to detectors 180 and 182 instead of in the connection from the reference oscillator 50 to these two detectors. Similarly the phase shift provided by circuits 184 and 186 may be selected so that the output of synchronous detector 180 is the signal —A and the signal from synchronous detector 182 is —B. If this is done inverter 188 may be omitted. Alternatively detectors 180 and 182 may supply the A and B program signals, respectively, and envelope detector 190 may be modified to provide a program signal of opposite phase, that is, $-(A+B)$.

Figure 9:
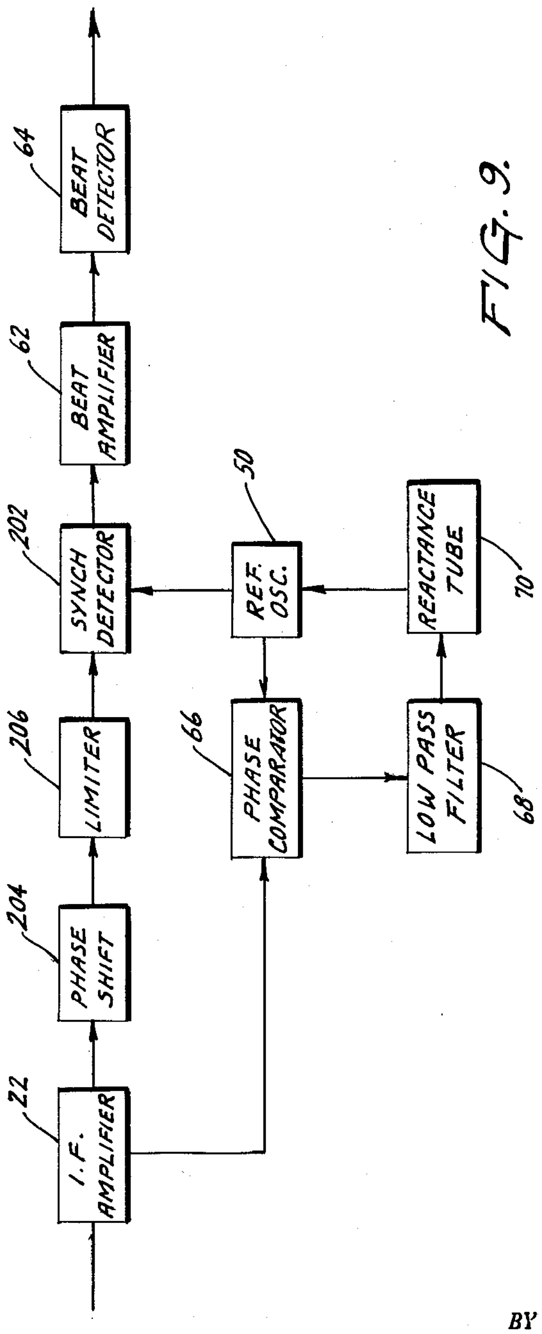
FIG. 9 is a block diagram of a squelch system which requires only a single synchronous detector to develop a beat signal.

FIG. 9 is a block diagram of a squelch circuit for developing a beat signal without a program signal through the use of a single synchronous detector. IF amplifier 22, phase comparator 66, reference oscillator 50, filter 68, amplifier 62 and detector 64 and reactance tube 70 correspond to similarly numbered circuits of FIG. 1. The signal from reference oscillator 50 is supplied to one input of synchronous detector 202. The signal from IF amplifier 22 is supplied to a second input of detector 202 through a phase shifter 204 and a limiter 206. Limiter 206 is arranged to remove all of the amplitude modulation present on the signal from amplifier 22. Phase shifter 204 causes the average carrier wave signal from amplifier 22 to be in phase with the reference signal supplied by reference oscillator 50. The phase of the reference signal with respect to the signal from IF amplifier 22 is such that no $(A-B)$ signal will be developed in synchronous detector 202. Limiter 206 removes substantially all of the amplitude variation of the incoming signal. Therefore there is no $(A+B)$ component in the output of detector 202. If there is no difference in frequency between the carrier wave supplied by amplifier 22 and oscillator 50 there will be no audio frequency signal developed at the output of synchronous detector 202. If there is a frequency difference between the signal supplied by amplifier 22 and oscillator 50 a beat signal will appear at the output of detector 202. This beat signal may be amplified and detected to provide a squelch signal. In certain types of synchronous detectors a shift in the average value of the anode potential accompanies the generation of the beat signal. This shift in average value may be employed directly as a squelch signal.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. In a receiver for single channel compatible stereophonic signals which includes a reference oscillator and a source of a first signal comprising two program signals multiplexed on an intermediate frequency carrier wave, means for generating a squelch signal comprising synchronous detector means responsive jointly to said first signal and the output signal of said reference oscillator for producing a first detected signal including selected program signal components, second detection means responsive to said first signal for producing a second detected signal including program signal components corresponding to said selected program signal components of said first detected signal, signal adder means for combining said first detected signal and said second detected signal to effect mutual cancellation of substantially all of the signal components of said first and second detected signals which are representative of said two program signals, and signal amplitude detector means for detecting the residual output signal, if any, of said signal adder means.

2. In a stereophonic receiver for single channel compatible stereophonic signals which includes a reference oscillator, a source of first signal comprising two program signal components multiplexed on a single carrier wave, and a phase control servo loop responsive to said first signal and the output signal of said reference oscillator for maintaining said output signal of said reference oscillator at a selected phase with respect to said carrier wave, means for generating a squelch signal in response to a difference in frequency between said output signal of said reference oscillator and said carrier wave, said squelch signal generating means comprising synchronous detector means responsive jointly to said first signal and the output signal of said reference oscillator for producing a first detected signal including selected program signal components, second detection means responsive to said first signal for producing a second detected signal including program signal components corresponding to said selected program signal components of said first detected signal, signal combining means for combining said first detected signal and said second detected signal to effect mutual cancellation of said program signal components of said first and second detected signals, and means for detecting the residual output signal, if any, of said signal combining means.

3. A squelch signal generating circuit in accordance with claim 2 wherein said second detection means comprises envelope detector means responsive only to said first signal.

4. A squelch signal generating circuit in accordance with claim 2 wherein said second detection means comprises a second synchronous detector means responsive jointly to said first signal and said output signal of said reference oscillator, the phase of said carrier wave with respect to said output signal of said reference oscillator being different for said first synchronous detector means than for said second synchronous detector means.

5. A squelch signal generating circuit in accordance with claim 2 wherein said synchronous detection means comprises first and second synchronous detector circuits each jointly responsive to said first signal and the output signal of said reference oscillator, and means for additively combining the output signals of said first and second detector circuits, and wherein said second detection means comprises an envelope detector circuit responsive only to said first signal.

6. In a stereophonic receiver for single channel compatible stereophonic signals which includes a reference oscillator, a source of a first signal comprising first and second program signal components multiplexed on a single carrier wave and a phase control servo loop responsive to said first signal and the output signal of said reference oscillator for maintaining said output signal of said reference oscillator at a selected phase with respect to said carrier wave, means for generating a squelch signal in response to a difference in frequency between said output signal of said reference oscillator and said carrier wave, said squelch circuit generating means comprising synchronous detector means responsive jointly to said first signal and said output signal of said oscillator, means for controlling the phase at said synchronous detector of said carrier wave with respect to said output signal so that the peaks of said reference wave occurs in time coincidence with the peaks of said carrier wave whereby the output signal of said synchronous detector circuit includes a component representative of the sum of said first and second program signal components, envelope detector means responsive to said first signal for producing an output signal representative of the sum of said first and second program signals, signal combining means for combining the output signal of said synchronous detector means and said amplitude detector means to effect mutual cancellation of said first and second program signal components in the output signal of each detector, and means for detecting the residual output signal, if any, of said signal combining means.

7. In a stereophonic receiver for single channel compatible stereophonic signals which includes a reference oscillator, a source of a first signal comprising two program signal components multiplexed on a single carrier wave, and a phase control servo loop responsive to said first signal and the output signal of said reference oscillator for maintaining said output signal of said reference oscillator at a selected phase with respect to said carrier wave, means for generating a squelch signal in response to a difference in frequency between said output signal of said reference oscillator and said carrier wave, said squelch signal generating means comprising first detector means responsive jointly to said first signal and the output of said reference oscillator circuit for producing a first detected signal having a beat signal component at a frequency equal to the difference in frequency between said carrier wave and output signal of said reference oscillator and a second component represenative of at least one of said program signals, second detector means responsive to said first signal for producing a second detected signal having a component representative of said program signals in the same relative phase and amplitude relationships as in said second component of said first detected signal, signal combining means for combining said first and second detected signals to effect mutual cancellation of said components representative of said program signals, and detector means coupled to said signal combining means for detecting signals in the frequency range of said beat signal component of said first detected signal.

8. In a stereophonic receiver for single channel compatible stereophonic signals which includes a reference oscillator, a source of a first signal comprising two program signal components multiplexed on a single carrier wave, and a phase control servo loop responsive to said first signal and the output signal of said reference oscillator for maintaining said output signal of said reference oscillator at a selected phase with respect to said carrier wave, means for generating a squelch signal in response to a difference in frequency between said output signal of said reference oscillator and said carrier wave, said squelch signal generating means comprising first detector means responsive jointly to said first signal and the output of said reference oscillator circuit for producing a first detected signal having a beat signal component at a frequency equal to the difference in frequency between said carrier wave and output signal of said reference oscillator and a second component representative of at least one of said program signals, second detector means responsive only to said first signal for producing a second detected signal having a component representative of said program signals in the same relative phase and amplitude relationship as in said second component of said first detected signal, said second detected signal being substantially free of any beat signal component, signal combining means for combining said first and second detected signals to effect mutual cancellation of said components representative of said program signals, and detector means coupled to said signal combining means for detecting signals in the frequency range of said beat signal component of said first detected signal.

9. In a stereophonic receiver which includes means for providing an intermediate frequency carrier wave modulated with a pair of stereophonic program signals, a circuit for generating a squelch signal comprising envelope detector means and synchronous detection means each responsive to said modulated carrier wave signal, signal adder means for combining the output signals of said envelope detector means and said synchronous detection means to effect mutual cancellation of substantially all stereophonic program signal components, and signal amplitude detector means responsive to the output of said signal adder means for detecting tuning beat signals generated in said synchronous detection means.

10. In a stereophonic receiver which includes means for providing an intermediate frequency carrier wave modulated with a pair of stereophonic program signals and means for providing a reference frequency wave, asynchronous detection means responsive to said modulated carrier wave signal for generating detected signals representative of the sum of said pair of stereophonic program signals, synchronous detection means responsive to said modulated carrier wave and said reference frequency wave to provide detected signals representative of said pair of stereophonic program signals, means for combining the outputs of said asynchronous detection means and said synchronous detection means to provide at first and second outputs signals representative of the first and second signals of said pair of stereophonic program signals, means coupled to said means providing said modulated carrier wave and to said source of reference frequency wave for generating a tuning beat signal substantially free of components representative of said pair of stereophonic program signals and means responsive to said tuning beat signal in said receiver for squelching the output signal of said synchronous detection means without affecting the output of said asynchronous detection means.

11. A stereophonic receiver as in claim 10 wherein said synchronous detection means provides a signal representative of the difference of said pair of stereophonic program signals.

12. A stereophonic receiver as in claim 10 wherein said asynchronous detection means comprises an envelope detector.

13. In a stereophonic receiver which includes means for providing an intermediate frequency carrier wave modulated with a pair of stereophonic program signals and means providing a reference frequency wave, asynchronous detection means responsive to said modulated carrier wave signal for supplying at first and second outputs signals representative of the sum of said pair of stereophonic program signals, synchronous detection means responsive to said modulated carrier wave and said reference frequency wave, first means for combining the output signal of said synchronous detection means with the signal supplied at said first output of said asynchronous detection means to provide a signal representative of a single one of said stereophonic program signals, second means for combining the output signal of said synchronous detection means with the signal supplied at said second output of said asynchronous detection means to provide a signal representative of the other one of said stereophonic program signals, means coupled to said means providing said modulated intermediate frequency carrier wave and said means providing said reference frequency wave for generating a tuning beat signal substantially free of components representative of said pair of stereophonic program signals, and means responsive to said tuning beat signal for squelching the output signal of said synchronous detection means without substantially affecting the output signal of said asynchronous detection means.

14. In a stereophonic receiver which includes means for providing a carrier wave modulated with a pair of stereophonic program signals, means for synchronously detecting said modulated carrier wave, means for asynchronously detecting said modulated carrier wave, means for combining the output signals of said means for synchronously detecting said modulated wave and said means for asynchronously detecting said modulated wave, means responsive to said modulated carrier wave for generating a tuning beat signal and means responsive to said tuning beat signal for squelching the output of said means for synchronously detecting said modulated wave without substantially affecting the output of said means for asynchronously detecting said modulated carrier wave.

References Cited in the file of this patent

UNITED STATES PATENTS

| | | |
|---|---|---|
| 2,261,628 | Lovell | Nov. 4, 1941 |
| 2,357,975 | Roberts | Sept. 12, 1944 |
| 2,524,702 | Hansell | Oct. 3, 1950 |
| 2,525,089 | Blumlein | Oct. 10, 1950 |
| 2,611,036 | Norgaard | Sept. 16, 1952 |
| 2,698,379 | Boelens et al. | Dec. 28, 1954 |
| 2,809,289 | Harris et al. | Oct. 8, 1957 |
| 2,924,706 | Sassler | Feb. 9, 1960 |
| 2,930,891 | Lakatos | Mar. 29, 1960 |
| 2,938,114 | Krause | May 24, 1960 |